United States Patent
Mourad

(10) Patent No.: US 8,098,714 B2
(45) Date of Patent: Jan. 17, 2012

(54) METHOD FOR ESTIMATING, IN A COMMUNICATION SYSTEM, THE LEVEL OF INTERFERENCE PLUS NOISE AFFECTING RECEIVED SIGNALS REPRESENTATIVE OF A SET OF RECEIVED PILOT SYMBOLS

(75) Inventor: Alain Mourad, Rennes Cedex 7 (FR)

(73) Assignee: Mitsubishi Electric Corporation, Tokyo (JP)

( * ) Notice: Subject to any disclaimer, the term of this patent is extended or adjusted under 35 U.S.C. 154(b) by 811 days.

(21) Appl. No.: 12/200,233

(22) Filed: Aug. 28, 2008

(65) Prior Publication Data

US 2009/0067558 A1  Mar. 12, 2009

(30) Foreign Application Priority Data

Aug. 31, 2007  (EP) .................................... 07017072

(51) Int. Cl.
*H04B 1/00* (2006.01)
(52) U.S. Cl. ........ 375/148; 375/144; 375/350; 455/501; 455/63.1; 455/67.11; 455/226.1
(58) Field of Classification Search .................. 375/144, 375/148, 230, 232, 340, 346, 349, 350; 455/501, 455/63.1, 67.11, 67.13, 226.1–226.3, 296; 370/491, 500

See application file for complete search history.

(56) References Cited

U.S. PATENT DOCUMENTS

| | | | |
|---|---|---|---|
| 6,633,552 B1 * | 10/2003 | Ling et al. ..................... | 370/318 |
| 7,272,169 B2 * | 9/2007 | Rouphael et al. ............. | 375/150 |
| 7,751,510 B2 * | 7/2010 | Budianu et al. ............... | 375/346 |
| 2008/0165891 A1 * | 7/2008 | Budianu et al. ............... | 375/299 |
| 2009/0176456 A1 * | 7/2009 | Hara et al. ..................... | 455/68 |

OTHER PUBLICATIONS

Aykut Bultan, et al. "Channel Estimation in Noisy Conditions using Time-Frequency Domain Filtering", Signals, Systems, and Computers, vol. 2, XP010373908, Oct. 24, 1999, pp. 1642-1646.

Mounir Ghogho, et al. "Improved Channel Estimation using Superimposed Training", IEEE 5$^{th}$ Workshop on Signal Processing Advances in Wireless Communications, XP010805982, Jul. 11-14, 2004, pp. 110-114.

* cited by examiner

*Primary Examiner* — Dac Ha
(74) *Attorney, Agent, or Firm* — Oblon, Spivak, McClelland, Maier & Neustadt, L.L.P.

(57) ABSTRACT

The present invention concerns a method for estimating, in a communication system, a level of interference plus noise affecting received signals representative of a set of received pilot symbols, characterized in that the method comprises the steps of:

dividing the set of received pilot symbols by a corresponding set of pilot symbols, filtering the divided set of received pilot symbols by a filter the coefficients of which are determined from an eigenvector associated with one of the lowest eigenvalues of a channel fading correlation matrix representative of the correlation between the channel coefficients affecting the set of pilot symbols, averaging up the square absolute values of the symbols obtained at the output of the filter in order to estimate the level of interference plus noise affecting the received signals.

14 Claims, 5 Drawing Sheets

| Number of paths | 6 |
|---|---|
| Mobile speed | 30 Km/h |
| Maximum Doppler frequency | 55.56 Hz |
| Power (dB) | [0 ; -1 ; -9 ; -10 ; -15 ; -20] |
| Delay (µs) | [0 ; 0.31 ; 0.71 ; 1.09 ; 1.73 ; 2.51] |

METHOD FOR ESTIMATING, IN A COMMUNICATION SYSTEM, THE LEVEL OF INTERFERENCE PLUS NOISE AFFECTING RECEIVED SIGNALS REPRESENTATIVE OF A SET OF RECEIVED PILOT SYMBOLS

The present invention relates to a method for estimating, in a communication system, the level of interference plus noise affecting received signals representative of a set of received pilot symbols.

A communication system generally suffers from interference and noise. Interference commonly refers to undesired received signals caused by the simultaneous usage of the system resources by different devices or different systems, while noise is mainly due to imperfect transceiver circuits.

The knowledge of the levels of interference plus noise experienced by the different devices over the different resources available enables improvement of the system performance through robust interference plus noise aware transmission and reception techniques. It also enables efficient interference plus noise aware link adaptation and resource allocation and management mechanisms.

As example, at the receiver side, the knowledge of interference plus noise level may be used for robust Minimum Mean Square Error (MMSE) estimation, equalization and detection, and also for enhanced channel decoding thanks to reliable soft bits like the Log Likelihood Ratios (LLR).

Adaptive Modulation and Coding (AMC), Hybrid—Automatic Repeat Request (H-ARQ), scheduling, power control, and handover are also examples of link adaptation and resource allocation and management mechanisms that may improve the system performance thanks to knowledge of the interference plus noise levels.

In the state of the art, several solutions are proposed for the estimation of the level of interference plus noise. Some solutions provide an estimate of an average level, the average being taken over the time and frequency variations of the propagation and interference conditions experienced by the received signals, while others provide an estimate of an instantaneous level defined for a given realization of the propagation and interference conditions over given frequency and time intervals. Thanks to their fine granularity, the solutions dealing with the estimation of an instantaneous level over given frequency and time intervals are more appealing than average level solutions.

The solutions dealing with the estimation of an instantaneous level of interference plus noise over given frequency and time intervals can be classified into two categories. The first category regroups solutions posterior-to-channel estimation that assume the presence of a reliable channel estimator that provides accurate estimate of the instantaneous channel fading over the given frequency and time intervals, whereas the second category regroups solutions prior-to-channel estimation that can be carried out before channel estimation thus without using the estimates of the instantaneous channel fading over the given frequency and time intervals.

The solutions prior-to-channel estimation are intrinsically more attractive than posterior-to-channel estimation solutions because first they are less complex to implement as they do not require the presence of a channel estimator, second they are insensitive to channel estimation errors, and third they enable improvement of the channel estimation accuracy thanks to providing an accurate level of the interference plus noise at the input of the channel estimator. But the main challenge of prior-to-channel estimation solutions is to still achieve high accuracy at reasonable complexity without using channel estimation outputs.

The aim of the invention is therefore to propose a method and a device which make it possible to accurately estimate the instantaneous level of interference plus noise prior to channel estimation and at a low complexity of implementation.

To that end, the present invention concerns a method for estimating, in a communication system, a level of interference plus noise affecting received signals representative of a set of received pilot symbols, characterized in that the method comprises the steps of:
dividing the set of received pilot symbols by a corresponding set of pilot symbols,
filtering the divided set of received pilot symbols by a filter the coefficients of which are determined from an eigenvector associated with one of the lowest eigenvalues of a channel fading correlation matrix representative of the correlation between the channel coefficients affecting the set of pilot symbols,
averaging up the square absolute values of the symbols obtained at the output of the filter in order to estimate the level of interference plus noise affecting the received signals.

The present invention concerns also a device for estimating, in a communication system, a level of interference plus noise affecting transmitted signals representative of a set of received pilot symbols, characterized in that the device comprises:
means for dividing the set of received pilot symbols by a corresponding set of pilot symbols,
means for filtering the divided set of received pilot symbols by a filter the coefficients of which are determined from an eigenvector associated with one of the lowest eigenvalues of a channel fading correlation matrix representative of the correlation between the channel coefficients affecting the set of received pilot symbols,
means for averaging up the square absolute values of the symbols obtained at the output of the filter in order to estimate the level of interference plus noise affecting the received signals.

Thus, by using a filter the coefficients of which are obtained from the eigenvector associated with one of the lowest eigenvalues of the channel fading correlation matrix, it becomes then possible to neglect the contribution of the part of received signals representative of the transmitted pilot symbols to the total energy of received signals. As a result, only the contribution of the part of received signals representative of the interference plus noise remains, which make it possible to deduce then the energy of interference plus noise from the energy of filtered signals.

According to a particular feature, the coefficients are obtained from the eigenvector associated with the lowest eigenvalue of the channel fading correlation matrix.

Thus, by using filter coefficients obtained from the eigenvector associated with the lowest eigenvalue of the channel fading correlation matrix, it becomes then possible to neglect the contribution of the part of received signals representative of the transmitted pilot symbols to the total energy of received signals. As a result, only the contribution of the part of received signals representative of the interference plus noise remains, which make it possible to deduce then the energy of interference plus noise from the energy of filtered signals.

According to a particular feature, the coefficients are obtained from the eigenvector associated with the lowest eigenvalue of the channel fading correlation matrix and from a diagonal matrix which coefficients are function of the set of pilot symbols and in that the method comprises further step of dividing the resulting average energy by a scalar value obtained from the filter coefficients and the set of pilot symbols.

Thus, the present invention is applicable when the pilot symbols have their absolute values not equal to unitary value.

According to a particular feature, plural sets of pilot symbols are received over different frequency sub-carriers and/or time intervals or over different groups of frequency sub-carriers and/or different groups of time intervals.

Thus, it is possible to estimate the level of interference plus noise on different frequency sub-carriers and/or time intervals or over different groups of frequency sub-carriers and/or different groups of time intervals.

When the pilot symbols are transmitted at same time interval but on different frequency intervals, the filtering is then performed over the frequency dimension. The channel fading correlation matrix is in this case representative of the frequency autocorrelation between the channel coefficients affecting the set of pilot symbols. The channel fading correlation matrix is determined from a model of the channel power delay profile that is suitable for the system and environment considered.

When the pilot symbols are transmitted on same frequency interval but within different time intervals, the filtering is then performed over the time dimension. The channel fading correlation matrix is in this case representative of the time autocorrelation between the channel coefficients affecting the set of pilot symbols. The channel fading correlation matrix is determined from a model of the channel Doppler spectrum that is suitable for the system and environment considered.

When the pilot symbols are transmitted on different frequency intervals and different time intervals, filtering is then performed over both frequency and time dimensions. The channel fading correlation matrix is in this case representative of the frequency and time autocorrelation between the channel coefficients affecting the set of pilot symbols. The channel fading correlation matrix is determined from models of the channel power delay profile and Doppler spectrum that are suitable for the system and environment considered.

According to a particular feature, the filter is a Finite Impulse Response filter comprising a finite number of coefficients.

According to a particular feature, the channel fading correlation matrix representative of the autocorrelation between the channel coefficients affecting the set of received pilot symbols is determined from theoretical or experimental models of the channel power delay profile and Doppler spectrum.

Thus, the channel correlation matrix representative of the correlation between the channel coefficients affecting the set of pilot symbols can be determined off line and the coefficients of the filter can then be stored into the memory of the device which estimates the level of interference plus noise over given frequency and time intervals.

According to a particular feature, when the received signals suffer from phase errors due for example to imperfect synchronization, the channel fading correlation matrix representative of the correlation between the channel coefficients affecting the set of pilot symbols is determined by taking into account available information on the statistical distribution of the phase errors.

Thus, the channel correlation matrix representative of the correlation between the channel coefficients affecting the set of pilot symbols can be determined off line. The coefficients of the filter can then be stored into the memory of the device which estimates the level of interference plus noise over given frequency and time intervals.

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer program are the same as those set out above related to the method and device according to the invention, they will not be repeated here.

The characteristics of the invention will emerge more clearly from a reading of the following description of an example embodiment, the said description being produced with reference to the accompanying drawings, among which:

Figure 1:
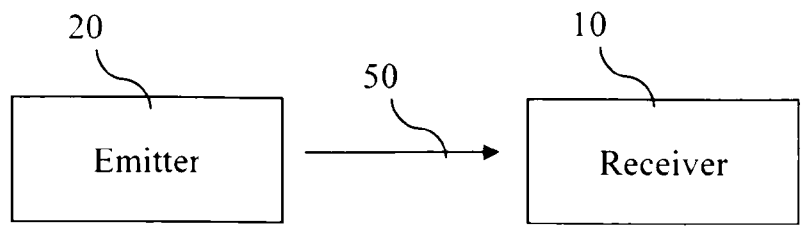
FIG. 1 is a diagram representing the architecture of a communication system

In a communication system, an emitter 20 transmits signals to at least a receiver 10 through a communication channel 50. The signals are representative of pilot symbols or data.

As example and in a non limitative way, the present invention is applicable to orthogonal frequency division multiplexing (OFDM)-based radio communication systems.

Preferably, the signals are transmitted over blocks of frequency intervals or sub-carriers and/or time intervals. These blocks are called as "resource blocks" or "chunks". A chunk comprises at least one frequency sub-carrier and one time interval or a chunk comprises a group of frequency sub-carriers preferably consecutive or a group of time intervals also preferably consecutive.

According to the present invention, the level of interference plus noise is estimated prior to channel estimation, i.e. without using any estimates of the instantaneous channel fading.

The present invention proposes an estimation of the instantaneous level of interference plus noise over at least one chunk of frequency sub-carriers and time intervals on which at least one pilot symbol is mapped.

For a chunk containing $N_p$ pilot symbols, the n-th received pilot symbol has the following standard form:

$$r_n = \sqrt{E_s} h_n s_n + v_n = a_n s_n + b_n; \forall n=1\ldots N_p$$

where $E_s$ is the received energy of the part of received signal representative of the transmitted pilot symbols, $h_n$ is the instantaneous channel fading, $s_n$ is the n-th transmitted pilot symbol, and $v_n$ is the corresponding n-th interference plus noise component of variance $E_v$.

The n-th received pilot symbol given in above equation assumes no phase errors. If phase errors occur, the n-th received pilot symbol can then be expressed as:

$$r_n = e^{j\phi_n}(\sqrt{E_s}h_n s_n + v_n) = a_n s_n + b_n; \forall n=1\ldots N_p$$

where $\phi_n$ denotes the phase error affecting the n-th received pilot symbol. $\phi_n$ is generally modeled by a uniform distribution within the interval $[\phi_0, \phi_1]$, with $\phi_0$ and $\phi_1$ being two parameters specific to the system under consideration.

The inventor of the present invention has found that, by applying a proper filtering to the at least one received pilot symbol, it is possible to extract accurately the level of interference plus noise $E_v$ affecting a given chunk.

Denoting by $c=[c_0, \ldots, c_{L-1}]^T$ the column vector of the coefficients of the Finite Impulse Response filter of length L, the m-th output of the filter is obtained as:

$$y_m = \sum_{l=0}^{L-1} c_l^* \frac{r_l^{(m)}}{s_l^{(m)}} = c^H x^{(m)}$$

where $[.]^*$ denotes the conjugate of $[.]$, $[.]^H$ denotes the transpose conjugate of $[.]$, and $x^{(m)}$ is associated with the vector of L received pilots symbols used for providing the m-th output $y_m$ of the filter.

As shown in the above equation, $x^{(m)}$ results from the division of the L received pilot symbols $\{r_l^{(m)}\}$ used for providing the m-th filter output $y_m$ by their corresponding pilot symbols $\{s_l^{(m)}\}$.

As the pilot symbols are known by the transmitter and the receiver, the corresponding pilot symbols are the pilot symbols transmitted by the transmitter.

By computing the energy of the symbols at the output of the filter for the given chunk, we get:

$$E_y = \frac{1}{M}\sum_{m=0}^{M-1} |y_m|^2 = c^H \left(\frac{1}{M}\sum_{m=0}^{M-1} x^{(m)} x^{(m)H}\right) c = c^H R c$$

where M denotes the number of filter outputs associated with the given chunk. R is a matrix of dimensions L×L that can be decomposed as:

$$R = E_s \Gamma + E_v D$$

The matrix $\Gamma$ of dimensions L×L represents the actual correlation of the channel coefficients affecting the sets of L filter inputs. The matrix $\Gamma$ is Hermitian, i.e. $\Gamma = \Gamma^H$. The matrix D of dimensions L×L is a diagonal matrix which elements are positive and functions of the transmitted pilot symbols as given below:

$$d_l = \frac{1}{M}\sum_{n=0}^{M-1} \frac{1}{|s_l^{(m)}|^2}$$

The energy of the filter outputs $\{y_m\}$ for a given chunk can then be written as:

$$E_y = E_v c^H D c \left(1 + SIR \frac{c^H \Gamma c}{c^H D c}\right)$$

Where $SIR = E_s/E_v$ is the Signal to Interference plus noise Ratio.

By choosing the coefficients of filter c in a way to keep the second term containing SIR in above equation much smaller than one, one can then extract an estimate of the interference plus noise level $E_v$ as:

$$\hat{E}_v = \frac{E_y}{c^H D c}$$

According to the invention, the coefficients of the optimal filter c are determined according to the following criterion:

$$c_{opt} = \arg\min_c \frac{c^H \Gamma c}{c^H D c}$$

The solution for the minimization problem above is found as, $c_{opt} = \sqrt{D}^{-1} u_{min}$ where $u_{min}$ is the eigenvector associated with the minimum eigenvalue of the matrix $\sqrt{D}^{-1}\Gamma\sqrt{D}^{-1}$, where $\sqrt{D}^{-1}$ is the diagonal matrix composed of the inverse of the square roots of the elements of matrix D.

It has to be noted here that in a variant, $u_{min}$ is the eigenvector associated with one of the minimum eigenvalues of the matrix $\sqrt{D}^{-1}\Gamma\sqrt{D}^{-1}$.

According to that variant, $u_{min}$ is the eigenvector associated with one of the minimum eigenvalues which is below a predetermined threshold.

Using an approximation for the actual channel correlation matrix $\Gamma$ and having knowledge of the matrix D, the optimal filter c can then be determined offline for a given filter size L.

It has to be noted here that the channel correlation matrix $\Gamma$ is determined from theoretical or experimental models of the power delay profile and Doppler spectrum of the channel, and in case of phase errors also from a theoretical or experimental statistical distribution of the phase errors.

As a first example, in Single Carrier Frequency Division Multiple Access (SC-FDMA) system specified for the uplink air interface in the Third Generation Partnership Project (3GPP)–Long Term Evolution (LTE), with a Finite Impulse Response filter of a length L=3 applied over an input set of 12 pilot symbols transmitted over adjacent sub-carriers, the following approximation $\Gamma_0$ of the channel correlation matrix $\Gamma$ is obtained from a rectangular power delay profile with maximum delay equal to the guard interval duration of 4.6875 µs, the latter being a parameter specific to the system:

$$\Gamma_0 = \begin{bmatrix} 1 & 0.9919 & 0.9678 \\ 0.9919 & 1 & 0.9919 \\ 0.9678 & 0.9919 & 1 \end{bmatrix}$$

The optimal filter coefficients are therefore found as:

c=[0.4105; −0.8143; 0.4105]

It has to be noted here that, as specified for SC-FDMA system in 3GPP-LTE, the pilot symbols are determined from a Zadoff-Chu sequence which absolute values of its elements are all equal to the unitary value, and hence the matrix D is equal to the identity matrix.

In such case, the solution for the minimization problem $$c_{opt} = \underset{c}{\operatorname{argmin}} \frac{c^H \Gamma c}{c^H D c}$$

is found as $c_{opt}=u_{min}$, where $u_{min}$ is the eigenvector associated with the minimum eigenvalue of the channel correlation matrix $\Gamma_0$, and the estimate of the interference plus noise level given by $$\hat{E}_v = \frac{E_y}{c^H D c}$$

simplifies to $\hat{E}_v = E_y$ since $c^H D c = 1$.

As a second example, in Orthogonal Frequency Division Multiple Access (OFDMA) system specified for the downlink air interface in 3GPP-LTE, with a Finite Impulse Response filter of a length L=7 applied over an input set of 10 pilot symbols transmitted over different sub-carriers with regular spacing equal to 6, an approximation $\Gamma_0$ of the channel correlation matrix $\Gamma$ is determined from an experimental model of the channel power delay profile and a uniform distribution of the phase error in the interval [0,13°]. The coefficients of the optimal filter given by the eigenvector associated with the minimum eigenvalue of $\Gamma_0$ is found as:

c=[0.0742+0.0454i; −0.0596−0.2830i;
−0.3466+0.3492i; 0.5557+0.1566i; −0.1132−
0.4788i; −0.1986+0.2102i; 0.0870]

It has to be noted here that, as specified for OFDMA system in 3GPP-LTE, the pilot symbols are determined from a Zadoff-Chu sequence which absolute values of its elements are all equal to the unitary value, and hence the matrix D is equal to the identity matrix.

In such case, the solution for the minimization problem $$c_{opt} = \underset{c}{\operatorname{argmin}} \frac{c^H \Gamma c}{c^H D c}$$

is found as $c_{opt}=u_{min}$, where $u_{min}$ is the eigenvector associated with the minimum eigenvalue of the channel correlation matrix $\Gamma_0$, and the estimate of the interference plus noise level given by $$\hat{E}_v = \frac{E_y}{c^H D c}$$

simplifies to $\hat{E}_v = E_y$ since $c^H D c = 1$.

Figure 2:
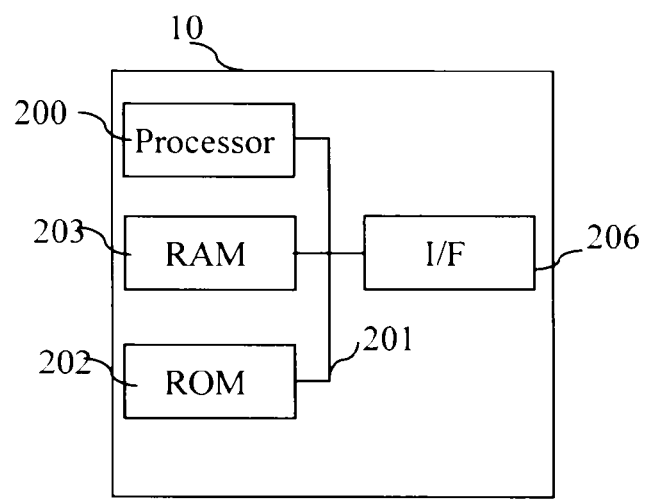
FIG. 2 is a block diagram of a receiver according to the present invention.

FIG. 2 is a block diagram of a receiver according to the present invention.

Figure 4:
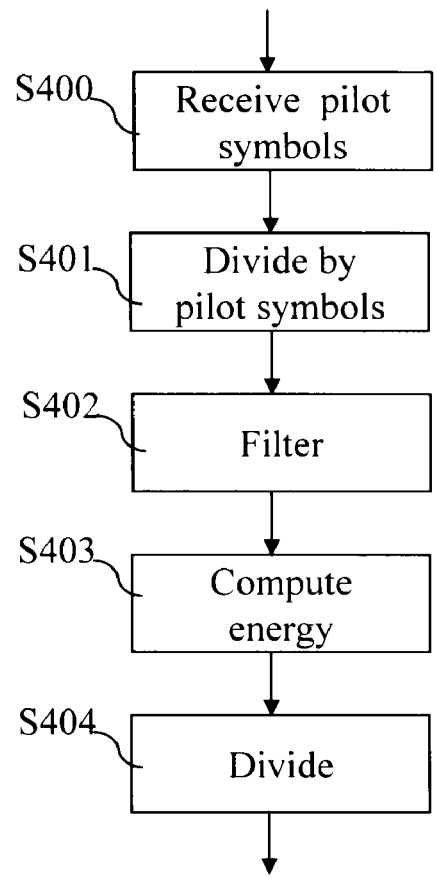
FIG. 4 is an algorithm executed by the receiver in order to estimate the interference plus noise level according to the present invention.

The receiver 10 has an architecture based on components connected together by a bus 201 and a processor 200 controlled by the program as disclosed in the FIG. 4.

The bus 201 links the processor 200 to a read only memory ROM 202, a random access memory RAM 203 and an interface 206.

The memory 203 contains registers intended to receive variables and the instructions of the program related to the algorithm as disclosed in the FIG. 4.

The processor 200 controls the operation and the interface 206.

The read only memory 202 contains instructions of the program related to the algorithm as disclosed in the FIG. 4, which is transferred, when the receiver is powered on to the random access memory 203.

The interface 206 comprises at least an interference level estimation device. The interference level estimation device will be described in more detail in reference to the FIG. 3.

The interface 206 is connected to a wired network like, as example, an electric power line network or a public switched telephone network (PSTN).

In another mode of realization, the interface 206 comprises at least one antenna and is a wireless interface.

Figure 3:
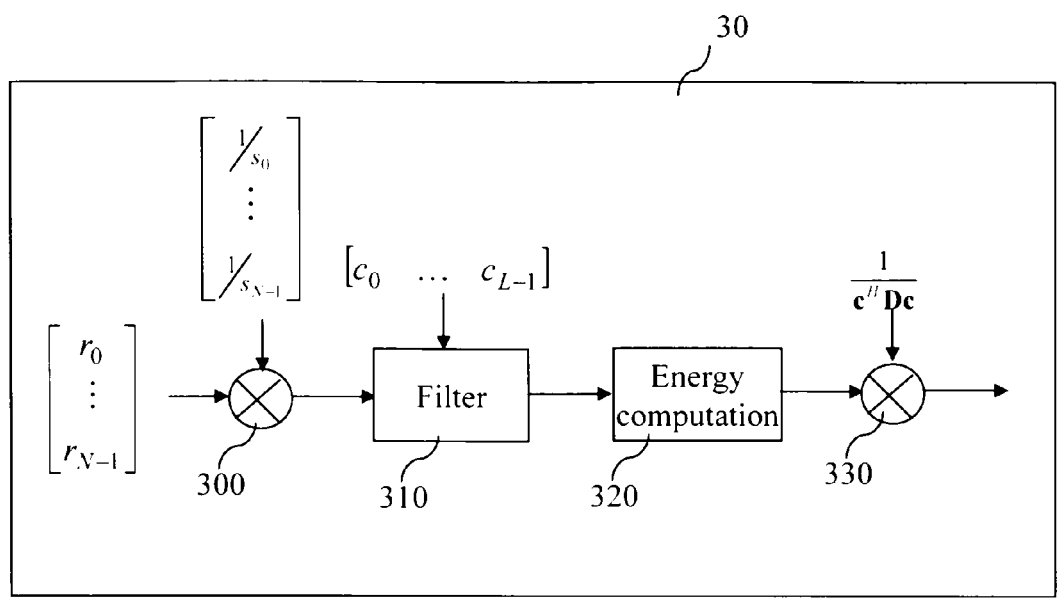
FIG. 3 is a block diagram of an interference plus noise level estimation device comprised in the receiver according to the present invention.

FIG. 3 is a block diagram of an interference level estimation device comprised in the interface of the receiver according to the present invention.

The interference level estimation device 30 comprises a multiplier 300 which multiplies the received pilot symbols $r_0$ to $r_{N-1}$ by the inverse of the pilots symbols $s_0$ to $s_{N-1}$, i.e. divides the received pilot symbols $r_0$ to $r_{N-1}$ by the pilots symbols $s_0$ to $S_{N-1}$ in order to form the data vectors $x^{(0)}$ to $x^{(M-1)}$.

The interference level estimation device 30 comprises, according to the present invention, a filter 310 of which the coefficients $[c_0, \ldots, c_{L-1}]^T$ are determined from $c_{opt}= \sqrt{D}^{-1} u_{min}$, where $u_{min}$ is the eigenvector associated with the minimum eigenvalue of the matrix $\sqrt{D}^{-1} \Gamma \sqrt{D}^{-1}$.

Since the channel correlation matrix $\Gamma$ is not known, an approximation $\Gamma_0$ of the channel correlation matrix is chosen. The approximation $\Gamma_0$ is chosen assuming a theoretical or experimental power delay profile and Doppler spectrum of the channel, and in case of phase errors at the receiver also taking into account information available on the statistics of phase errors.

Each data vector $x^{(m)}=[x^{(m)}_0, \ldots x^{(m)}_{L-1}]^T$ is filtered by the Finite Impulse Response filter 310 in order to form output filter $y_m = c^H x^{(m)}$, where m ranges from 0 to M=N−L+1 and $x^{(m)}$, gives the divided pilot symbol that is multiplied by the l-th coefficient of the filter 310 to provide the m-th output $y_m$ of the filter 310.

The interference level estimation device 30 comprises also an energy computation module 320 which calculates the energy of the output of the filter 310 according to the following formula:

$$E_y = \frac{1}{M} \sum_{m=0}^{M-1} |y_m|^2$$

The interference level estimation device 30 comprises also a multiplier 330 which multiplies the computed energy by a scaling factor which is equal to $$\frac{1}{c^H D c}$$

in order to obtain the estimate $$\hat{E}_v = \frac{E_y}{c^H D c}$$

of the interference plus noise level $E_v$.

FIG. 4 is an algorithm executed by the receiver in order to estimate the interference level according to the present invention.

At step S400, pilot symbols are received.

At next step S401, the received pilot symbols $r_0$ to $r_{N-1}$ are divided by the pilots symbols $s_0$ to $s_{N-1}$ in order to form the data vectors $x^{(0)}$ to $x^{(M-1)}$, with $x^{(m)} = [x^{(m)}_0, \ldots, x^{(m)}_{L-1}]^T$ and m ranges from 0 to M−1.

At next step S402, each data vector $x^{(m)} = [x^{(m)}_0, \ldots x^{(m)}_{L-1}]^T$ is filtered in order to provide the associated output filter $y_m$.

At next step S403, the energy of the filter outputs is calculated according to the following formula $$E_y = \frac{1}{M} \sum_{m=0}^{M-1} |y_m|^2.$$

At next step S403, the computed energy is multiplied by a scaling factor which is equal to $$\frac{1}{c^H D c}$$

in order to obtain the estimate $$\hat{E}_v = \frac{E_y}{c^H D c}$$

of the interference plus noise level $E_v$.

Figure 5:
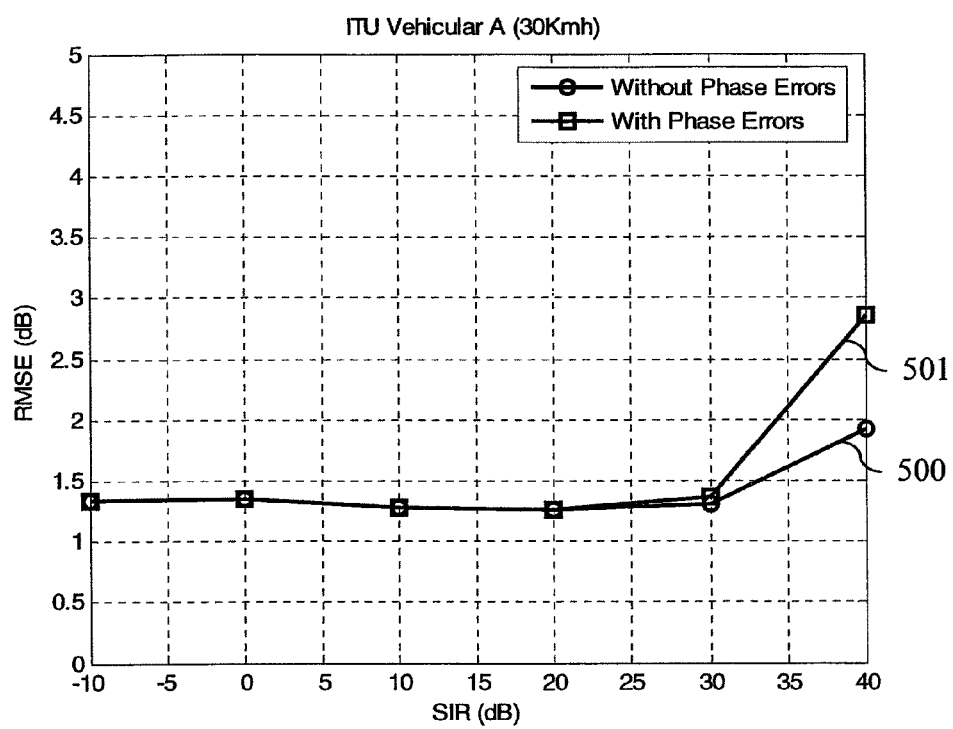
FIG. 5 shows the performance of interference plus noise estimation method when using an appropriate filter for SC-FDMA system of bandwidth 20 MHz in Single Input Single Output (SISO) context.

FIG. 5 shows the performance of interference plus noise estimation method when using the filter determined above for SC-FDMA system of bandwidth 20 MHz in Single Input Single Output (SISO) context, i.e. one antenna at the emitter and one antenna at the receiver, as specified for the uplink air interface in 3GPP LTE.

The performance is evaluated in term of the Root Mean Square Error (RMSE) in decibels (dB) dB versus SIR ratio in dB. The lower the RMSE is, the higher the accuracy of estimation is.

The curve 500 shows RMSE performance when no phase errors occur, whereas curve 501 shows RMSE performance when phase errors occur following a uniform distribution in the interval [0,13°], the latter value of 13° being obtained from experimental data. The channel model is ITU Vehicular A detailed in the FIG. 7.

From FIG. 5, the proposed filter is shown to achieve a high estimation accuracy reflected by an RMSE less than 1.5 dB for SIR up to 30 dB and this with and without phase errors. In curve 501, the phase errors are shown to slightly degrade the performance only at very high SIR of greater than 30 dB.

It is important to note here that the performance shown in FIG. 5 keeps almost the same for several channel models.

It is also worth pointing out that in a Multiple Input Multiple Output (MIMO) context, i.e. multiple antennas at the emitter and multiple antennas at the receiver, the RMSE significantly drops approaching the ideal theoretical lower bound thanks to a higher number of pilots used for averaging.

Figures 6, 7:
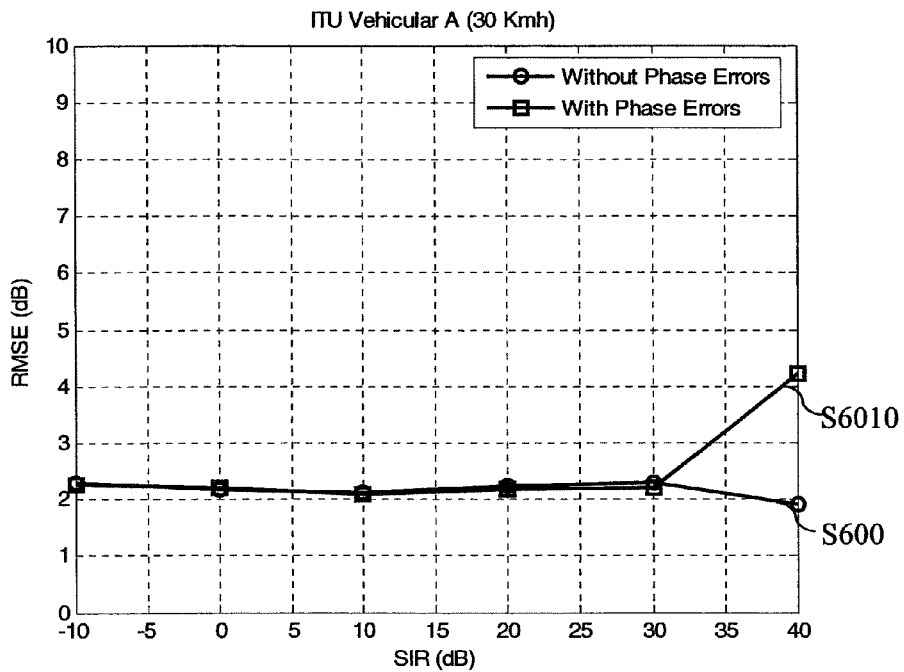
FIG. 6 shows the performance of interference plus noise estimation method when using an appropriate filter for OFDMA system of bandwidth 10 MHz in Single Input Single Output (SISO) context.
FIG. 7 is the channel model Vehicular A given by the International Telecommunication Union.

FIG. 6 shows the performance of interference plus noise estimation method when using an appropriate filter for OFDMA system of bandwidth 10 MHz in Single Input Single Output (SISO) context, i.e. one antenna at the emitter and one antenna at the receiver, as specified for the downlink air interface in 3GPP LTE.

The performance is evaluated in term of the Root Mean Square Error (RMSE) in dB versus SIR ratio in dB. The lower the RMSE is, the higher the accuracy of estimation is. The curve 600 shows RMSE performance when no phase errors occur, whereas curve 601 shows RMSE performance when phase errors occur following a uniform distribution in the interval [0,13°], the latter value of 13° being obtained from experimental data. The channel model is ITU Vehicular A detailed in the FIG. 7.

From FIG. 6, the proposed filter is shown to achieve a high estimation accuracy reflected by an RMSE less than 2 dB for SIR up to 30 dB and this with and without phase errors. In curve 601, the phase errors are shown to degrade the RMSE performance only at very high SIR of greater than 30 dB.

It is important to note here that the performance shown in FIG. 6 keeps almost the same for several channel models.

It is also worth pointing out that in a Multiple Input Multiple Output (MIMO) context, i.e. multiple antennas at the emitter and multiple antennas at the receiver, the RMSE significantly drops approaching the ideal theoretical lower bound thanks to a higher number of pilots used for averaging.

FIG. 7 is the channel model Vehicular A given by the International Telecommunication Union.

The channel model Vehicular A has six paths, and considers a speed of displacement of a mobile terminal of 30 km/h. The maximum Doppler frequency is equal to 55.56 Hz.

The attenuation power is equal to 0 dB for the first path, is equal to −1 dB for the second path, is equal to −9 dB for the third path, is equal to −10 dB for the fourth path, is equal to −15 dB for the fifth path and is equal to 2.5 dB for the sixth path.

The propagation delay is equal to 0 µs for the first path, is equal to 0.31 µs for the second path, is equal to 0.71 µs for the third path, is equal to 1.09 µs for the fourth path, is equal to 1.73 µs for the fifth path and is equal to 2.51 µs for the sixth path.

Naturally, many modifications can be made to the embodiments of the invention described above without departing from the scope of the present invention.

The invention claimed is:

1. Method for estimating, in a communication system, a level of interference plus noise affecting received signals representative of a set of received pilot symbols, characterized in that the method comprises the steps of:
    dividing the set of received pilot symbols by a corresponding set of pilot symbols, the corresponding pilot symbols being the pilot symbols transmitted by a transmitter,
    filtering the divided set of received pilot symbols by a filter the coefficients of which are determined from an eigenvector associated with one of the lowest eigenvalues of a channel fading correlation matrix representative of the autocorrelation between the channel coefficients affecting the set of pilot symbols,
    averaging up the square absolute values of the symbols obtained at the output of the filter in order to estimate the level of interference plus noise affecting the received signals.

2. Method according to claim 1, characterized in that the coefficients of the filter are obtained from the eigenvector associated with the lowest eigenvalue of the channel fading correlation matrix.

3. Method according to claim 2, characterised in that the coefficients are obtained from the eigenvector associated with the lowest eigenvalue of the channel fading correlation matrix and from a diagonal matrix which coefficients are function of the corresponding set of pilot symbols and in that the method comprises further step of dividing a resulting average energy by a scalar value obtained from the filter coefficients and the corresponding set of pilot symbols.

4. Method according to any of the claims 1 to 3, characterised in that plural sets of pilot symbols are received over different frequency sub-carriers and/or time intervals or over different groups of frequency sub-carriers and/or different groups of time intervals.

5. Method according to claim 3, characterized in that the filter is a Finite Impulse Response filter comprising a finite number of coefficients.

6. Method according to any of the claims 1 to 3 or 5, characterized in that the channel fading correlation matrix representative of the autocorrelation between the channel coefficients affecting the set of received pilot symbols is determined from theoretical or experimental models of the channel power delay profile and Doppler spectrum.

7. Method according to claim 6, characterized in that the channel fading correlation matrix representative of the autocorrelation between the channel coefficients affecting the set of received pilot symbols is also determined by taking into account information available on the statistical distribution of the phase errors.

8. Device for estimating, in a communication system, a level of interference plus noise affecting received signals representative of a set of received pilot symbols, characterized in that the device comprises:

means for dividing the set of received pilot symbols by a corresponding set of pilot symbols, the corresponding pilot symbols being the pilot symbols transmitted by a transmitter, means for filtering the divided set of received pilot symbols by a filter the coefficients of which are determined from an eigenvector associated with one of the lowest eigenvalues of a channel fading correlation matrix representative of the autocorrelation between the channel coefficients affecting the set of received pilot symbols, means for averaging up the square absolute values of the symbols obtained at the output of the filter in order to estimate the level of interference plus noise affecting the received signals.

9. Device according to claim 8, characterized in that the coefficients are obtained from the eigenvector associated with the lowest eigenvalue of the channel fading correlation matrix.

10. Device according to claim 8, characterised in that the coefficients are obtained from the eigenvector associated with the lowest eigenvalue of the channel fading correlation matrix and from a diagonal matrix which coefficients are function of the corresponding set of pilot symbols and in that the device further comprises means for dividing a resulting average energy by a scalar value obtained from the filter coefficients and the corresponding set of pilot symbols.

11. Computer program which can be directly loadable into a programmable device, comprising instructions or portions of code for implementing the steps of the method according to any of the claims 1 to 3, or 5 or 7, when said computer program is executed on a programmable device.

12. Method according to claim 4, characterized in that the channel fading correlation matrix representative of the autocorrelation between the channel coefficients affecting the set of received pilot symbols is determined from theoretical or experimental models of the channel power delay profile and Doppler spectrum.

13. Computer program which can be directly loadable into a programmable device, comprising instructions or portions of code for implementing the steps of the method according to claim 4, when said computer program is executed on a programmable device.

14. Computer program which can be directly loadable into a programmable device, comprising instructions or portions of code for implementing the steps of the method according to claim 6, when said computer program is executed on a programmable device.

\* \* \* \* \*